US012808158B2

(12) United States Patent
Takagi et al.

(10) Patent No.: US 12,808,158 B2
(45) Date of Patent: Nov. 24, 2026

(54) POWER FEED SYSTEM OF ELECTRICALLY DRIVEN CONSTRUCTION MACHINE

(71) Applicant: Hitachi Construction Machinery Tierra Co., Ltd., Koka (JP)

(72) Inventors: Wataru Takagi, Koka (JP); Takeshi Ishii, Koka (JP); Takeyuki Oomiya, Koka (JP); Hiroshi Kawaguchi, Koka (JP)

(73) Assignee: Hitachi Construction Machinery Tierra Co., Ltd., Koka (JP)

( * ) Notice: Subject to any disclaimer, the term of this patent is extended or adjusted under 35 U.S.C. 154(b) by 0 days.

(21) Appl. No.: 19/101,651

(22) PCT Filed: Aug. 24, 2023

(86) PCT No.: PCT/JP2023/030620

§ 371 (c)(1),
(2) Date: Feb. 6, 2025

(87) PCT Pub. No.: WO2024/070368

PCT Pub. Date: Apr. 4, 2024

(65) Prior Publication Data

US 2026/0062894 A1 Mar. 5, 2026

(30) Foreign Application Priority Data

Sep. 30, 2022 (JP) ................................ 2022-159038

(51) Int. Cl.
*E02F 9/26* (2006.01)
*B60L 9/00* (2019.01)
(Continued)

(52) U.S. Cl.
CPC .................. *E02F 9/26* (2013.01); *B60L 9/00* (2013.01); *B60R 16/0207* (2013.01); *E02F 9/2058* (2013.01)

(58) Field of Classification Search
None
See application file for complete search history.

(56) References Cited

U.S. PATENT DOCUMENTS 6,119,837 A * 9/2000 Tschurbanoff .......... E21C 33/00
191/12.2 A
11,753,283 B2 * 9/2023 Paoletti .................... B66D 1/08
254/269
(Continued)

FOREIGN PATENT DOCUMENTS

CN 106348106 A * 1/2017
CN 216379315 U * 4/2022
(Continued)

OTHER PUBLICATIONS

Machine translation of KR-20090070167-A (Year: 2026).*
(Continued)

*Primary Examiner* — Jennifer M Anda
(74) *Attorney, Agent, or Firm* — Crowell & Moring LLP

(57) ABSTRACT

A power feed system of an electrically driven construction machine that can enhance the work efficiency of the electrically driven construction machine while preventing damage to a power feed cable is provided. The power feed system includes a cable drum from and by which the power feed cable from an external power supply is drawn out and wound up, a drum sensor, a rotation angle sensor that senses the routing direction of the power feed cable with respect to an electrically driven excavator, a monitor, and a controller. The controller computes the wound-up length of the power feed cable wound up by the cable drum on the basis of the rotation amount of the cable drum sensed by the drum sensor and causes the monitor to simultaneously display this wound-up length and the routing direction sensed by the rotation angle sensor.

5 Claims, 10 Drawing Sheets

(51) Int. Cl.
*B60R 16/02* (2006.01)
*E02F 9/20* (2006.01)

(56) References Cited

U.S. PATENT DOCUMENTS

| | | | | |
|---|---|---|---|---|
| 2012/0136564 | A1 | 5/2012 | Everett et al. | |
| 2012/0303224 | A1* | 11/2012 | Keefer | E02F 3/304<br>701/50 |
| 2014/0027228 | A1* | 1/2014 | Tojima | E02F 9/207<br>191/12.2 A |
| 2018/0215573 | A1* | 8/2018 | Tarasinski | H02G 1/06 |
| 2023/0128121 | A1* | 4/2023 | Furukawa | E02F 3/325<br>307/9.1 |
| 2023/0286525 | A1* | 9/2023 | Danguchi | B60W 50/14 |
| 2025/0270793 | A1* | 8/2025 | Kojima | G08B 21/02 |
| 2026/0042367 | A1* | 2/2026 | Kuwahara | B60L 53/18 |

FOREIGN PATENT DOCUMENTS

| | | | | | |
|---|---|---|---|---|---|
| JP | 2008-190231 | A | | 8/2008 | |
| JP | 2010-65445 | A | | 3/2010 | |
| JP | 2010065445 | A | * | 3/2010 | |
| JP | 2017-14687 | A | | 1/2017 | |
| JP | 2017014687 | A | * | 1/2017 | |
| JP | 2018-17011 | A | | 2/2018 | |
| JP | 2018-84099 | A | | 5/2018 | |
| KR | 20090070167 | A | * | 7/2009 | E02F 9/24 |
| KR | 10-2012-0114879 | A | | 10/2012 | |
| KR | 20120114879 | A | * | 10/2012 | H02J 7/00 |

OTHER PUBLICATIONS

Machine translation of CN-106348106-A (Year: 2026).*
Machine translation of CN-216379315-U (Year: 2026).*
Machine translation of JP-2017014687-A (Year: 2026).*
Machine translation of KR-20120114879-A (Year: 2026).*
Machine translation of JP-2010065445-A (Year: 2026).*
International Preliminary Report on Patentability (PCT/IB/338 & PCT/IB/373) issued in PCT Application No. PCT/JP2023/030620 dated Apr. 10, 2025, including English translation of Written Opinion (PCT/ISA/237) (5 pages).
International Search Report (PCT/ISA/210) issued in PCT Application No. PCT/JP2023/030620 dated Sep. 19, 2023 with English translation (5 pages).
Japanese-language Written Opinion (PCT/ISA/237) issued in PCT Application No. PCT/JP2023/030620 dated Sep. 19, 2023 with English translation (5 pages).

* cited by examiner

[FIG. 1]
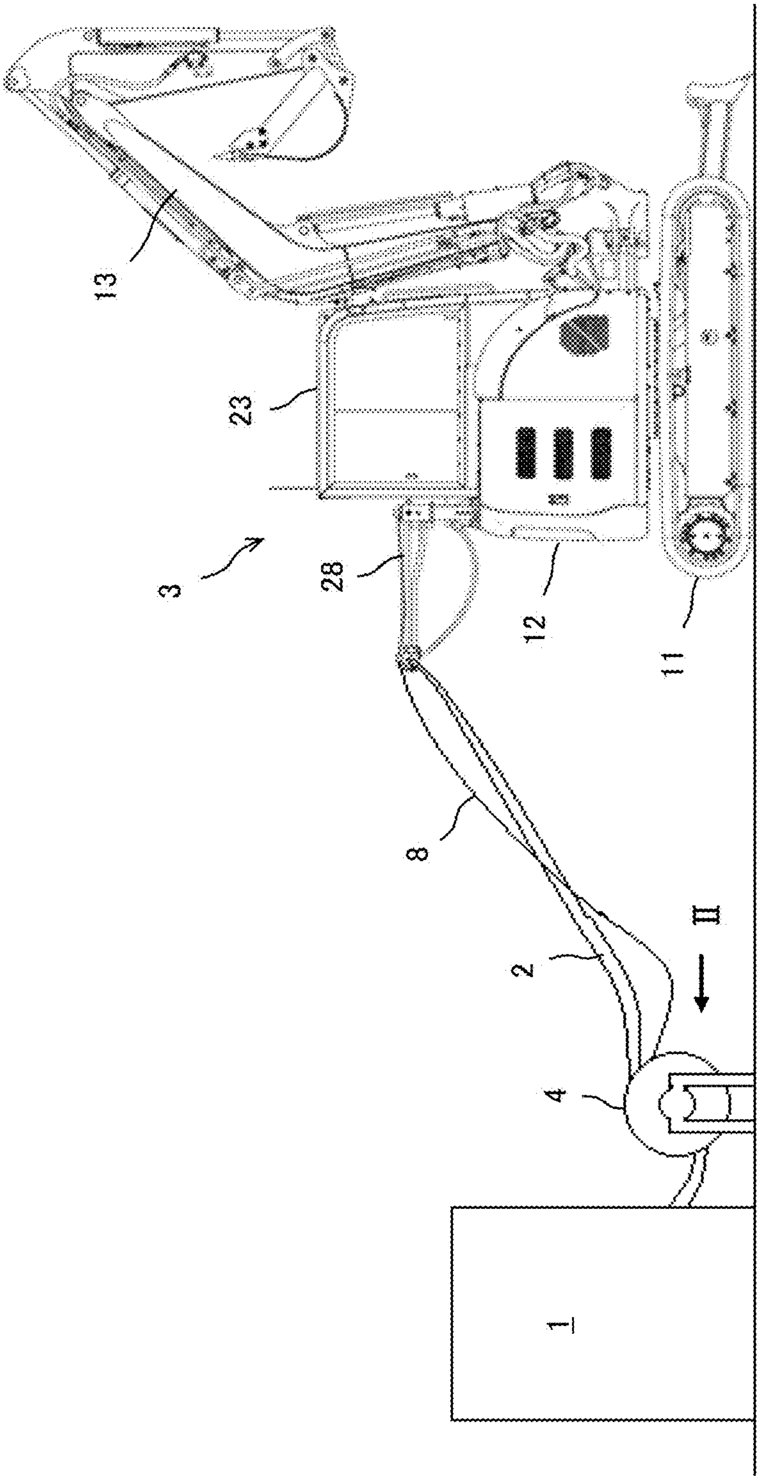

[FIG. 2]
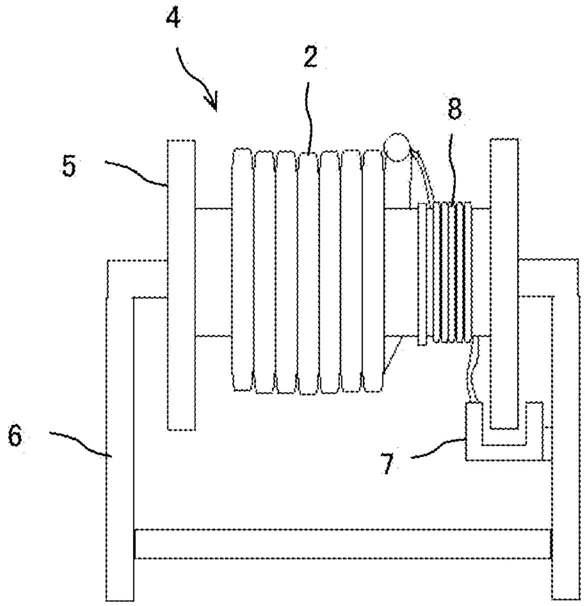

[FIG. 3]
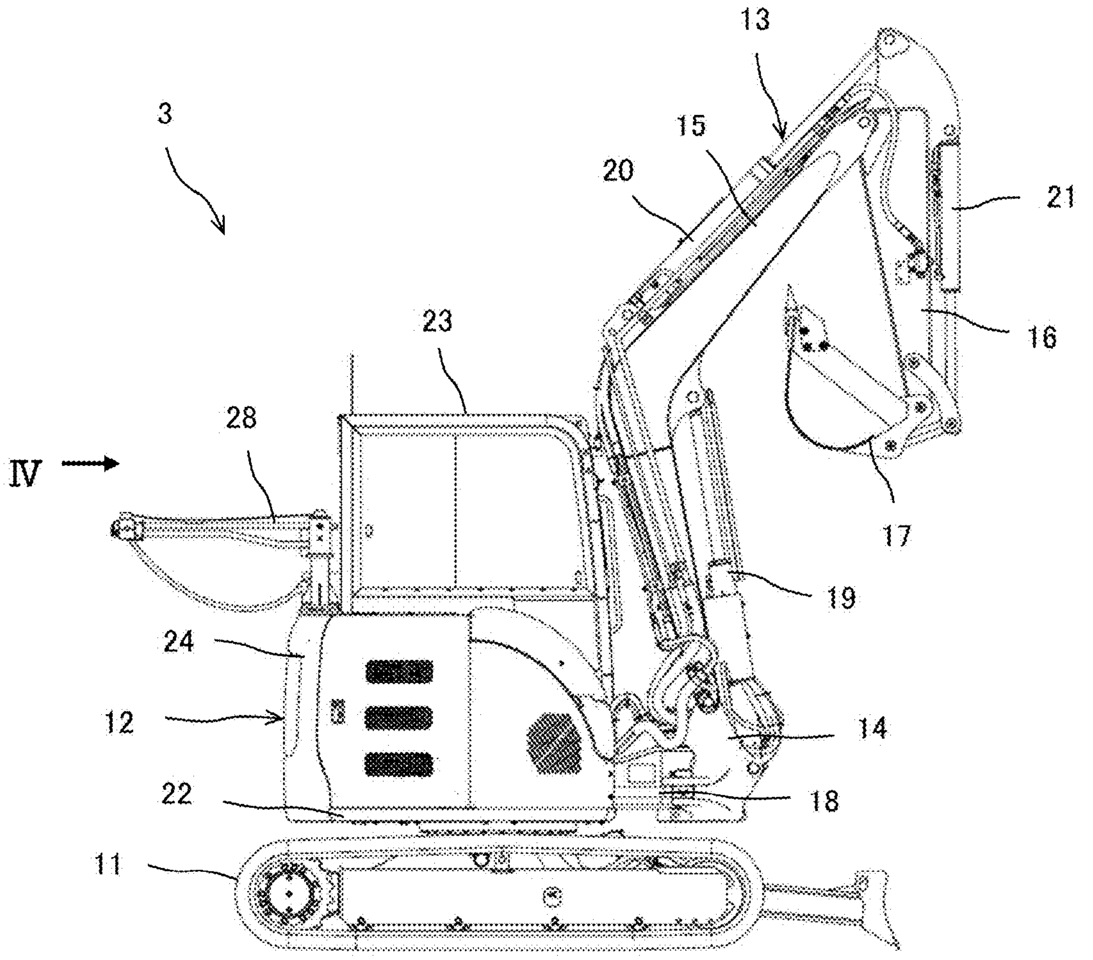

[FIG. 4]
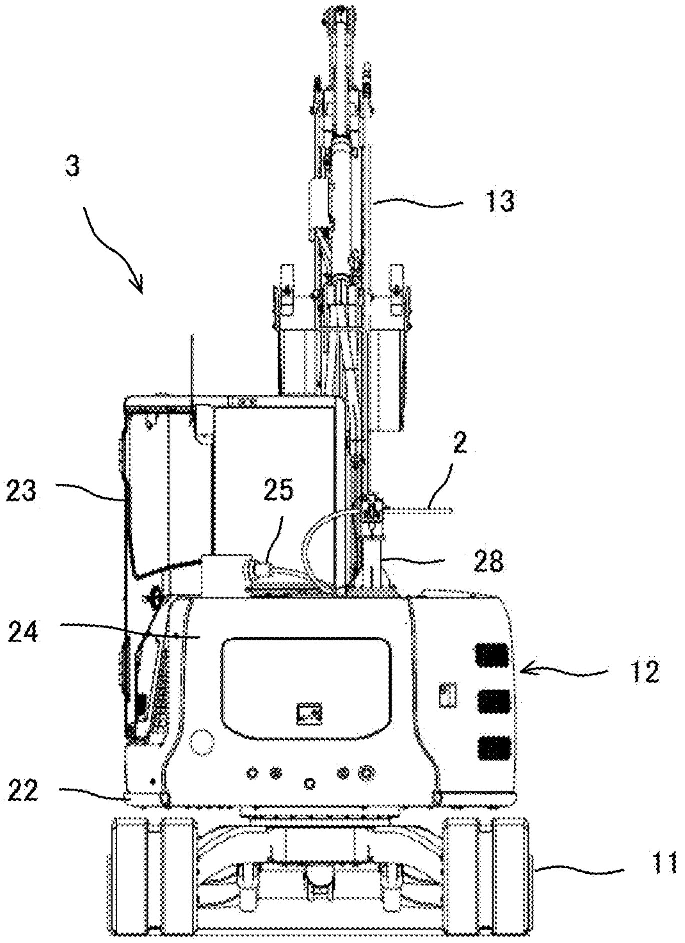

[FIG. 5]
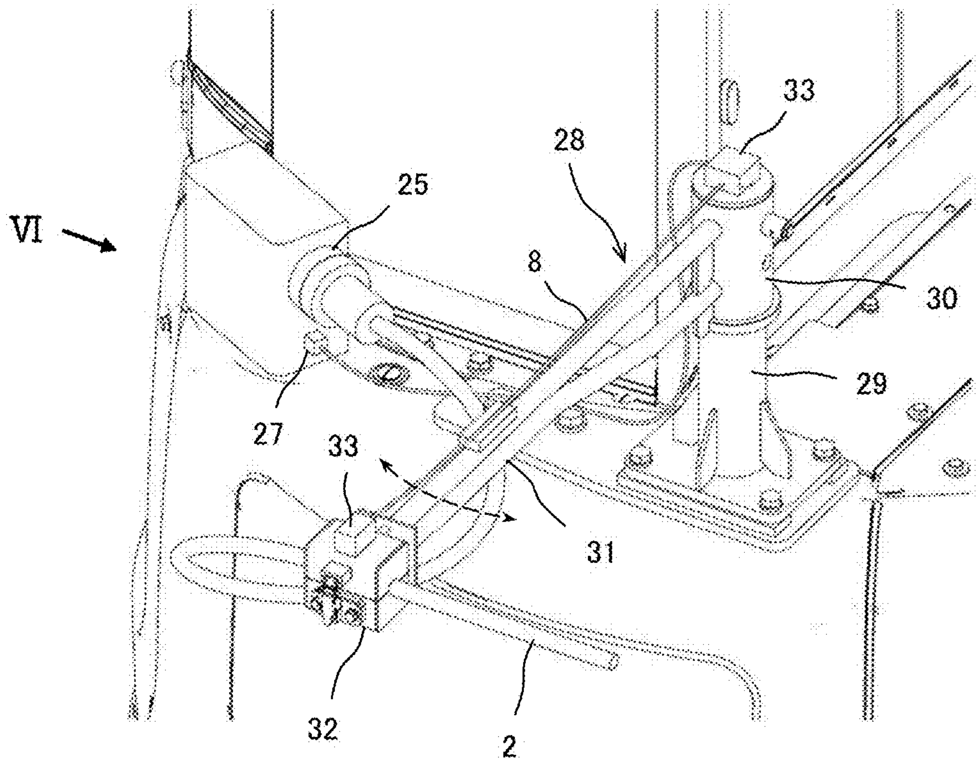
[FIG. 6]
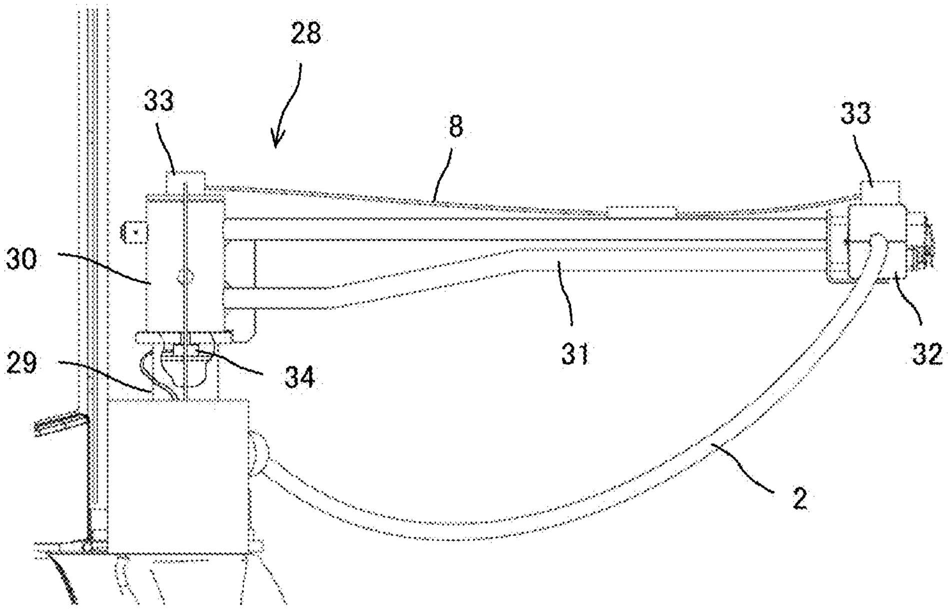

[FIG. 7]
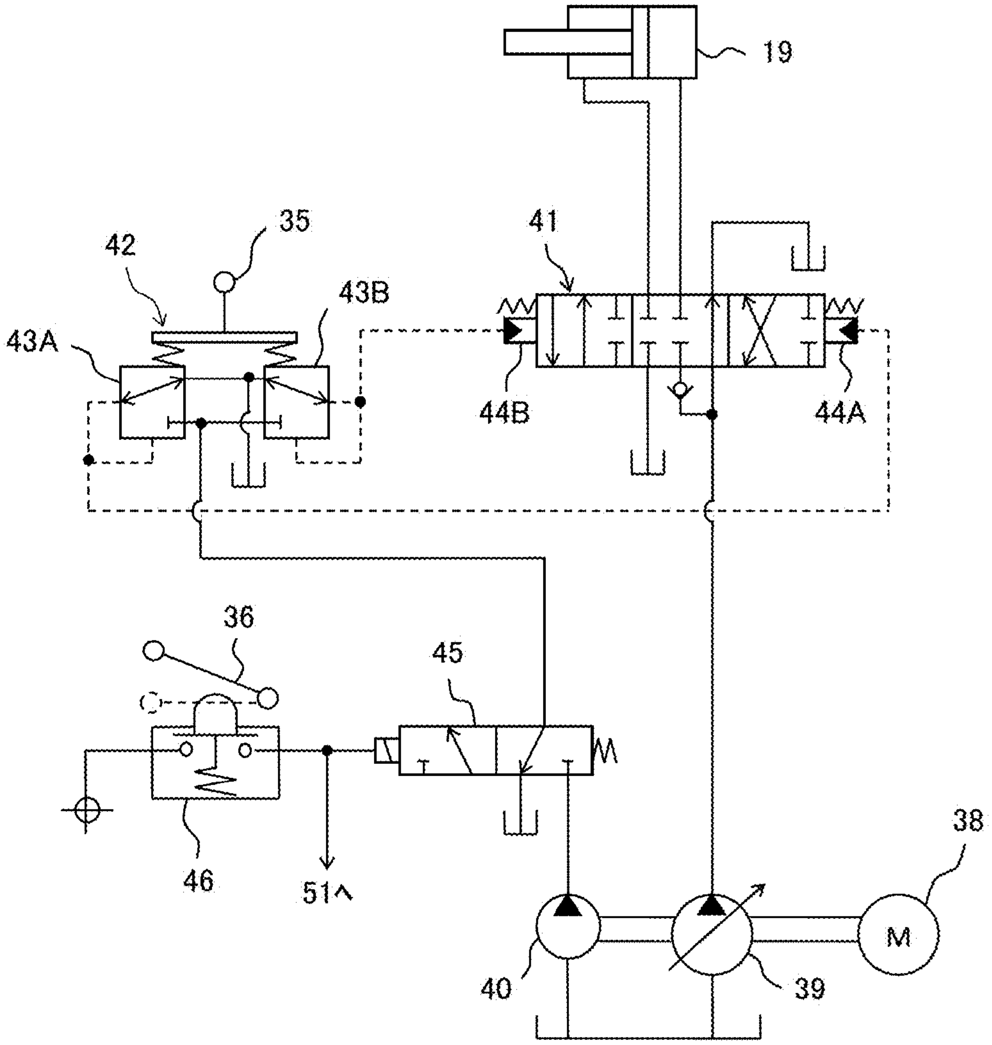

[FIG. 8]
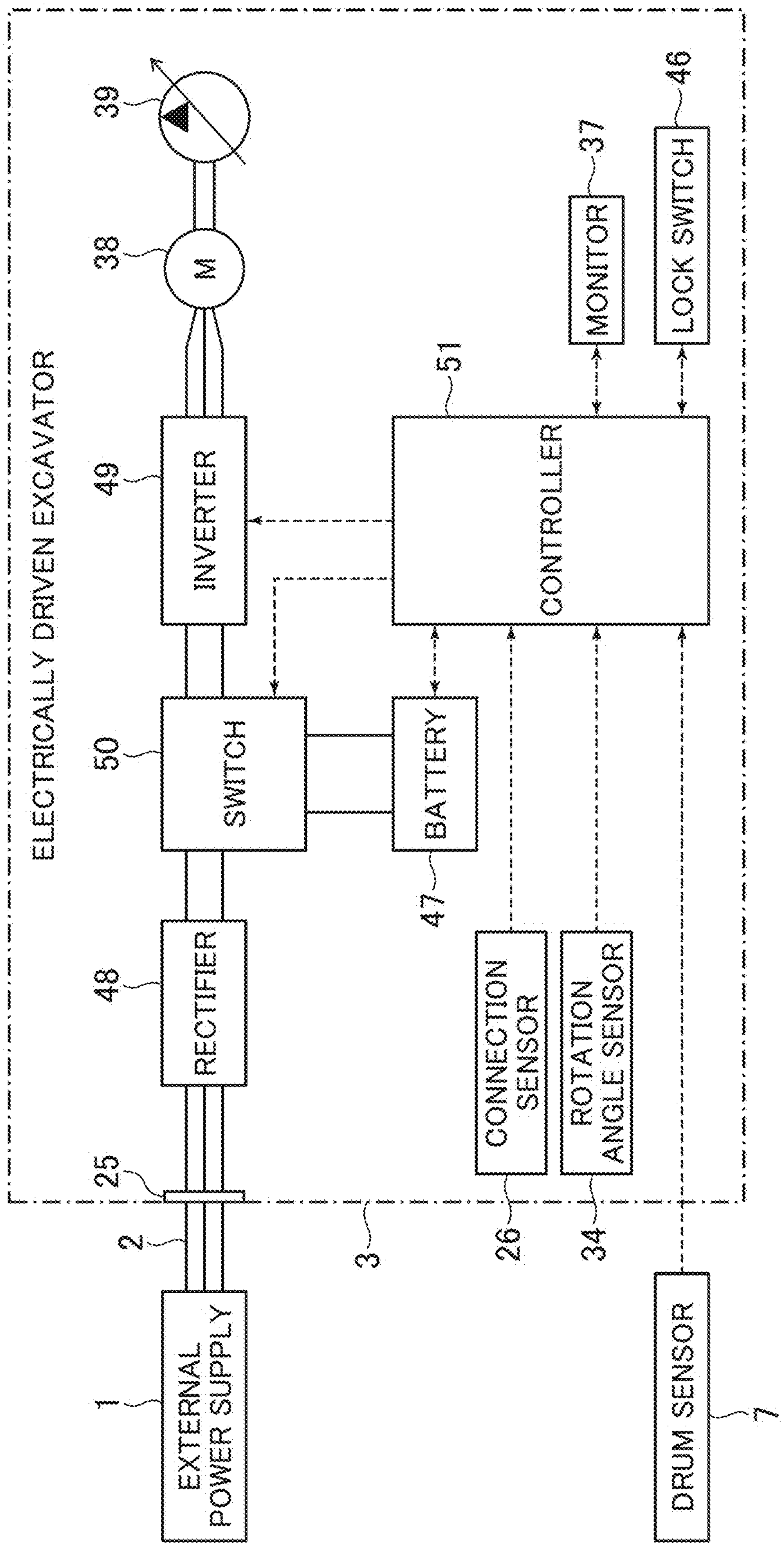

[FIG. 9]
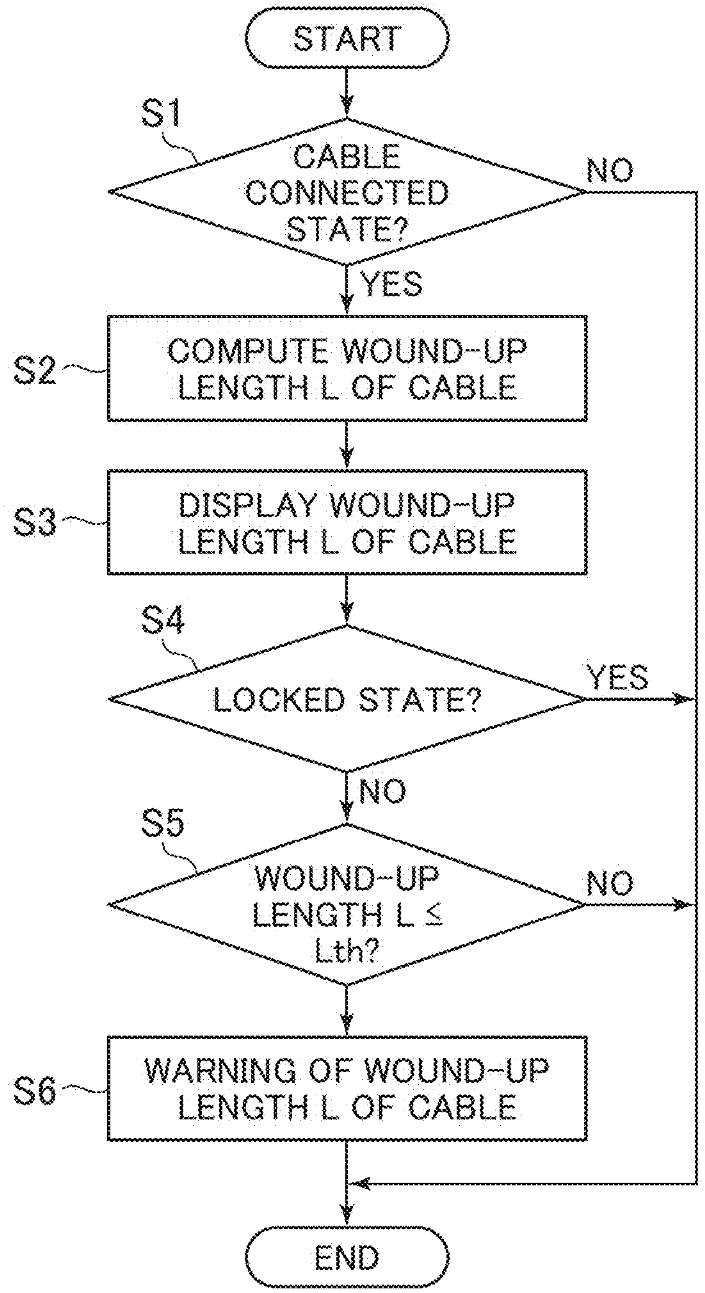

[FIG. 10]
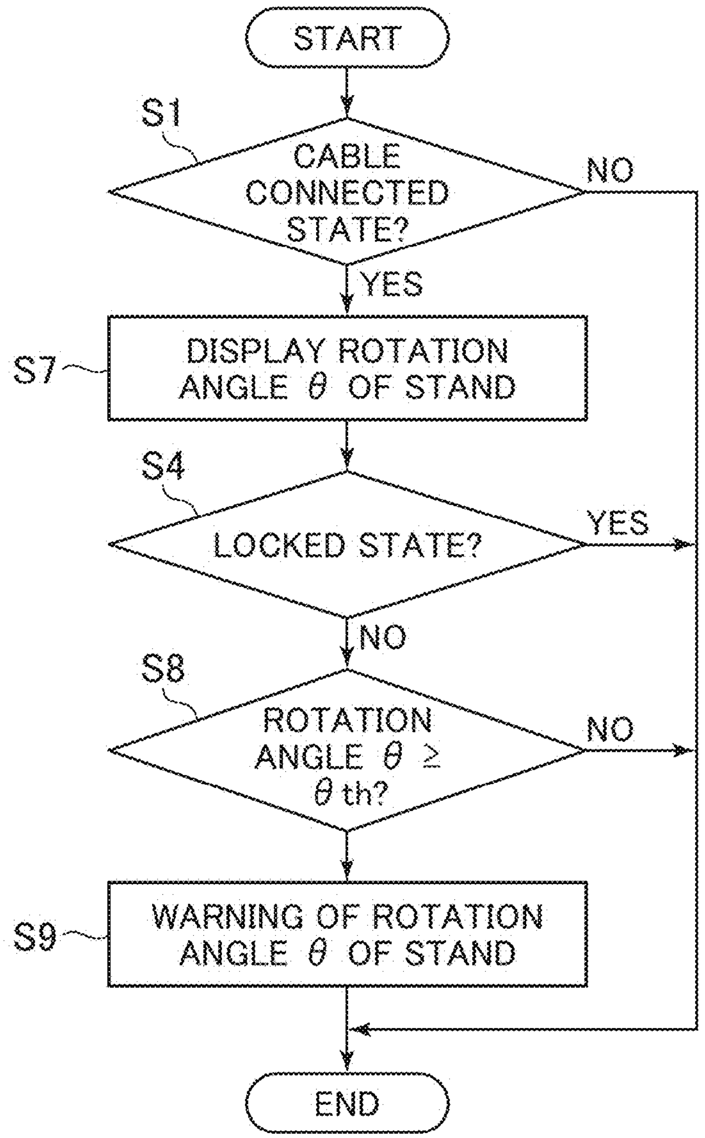

[FIG. 11A]
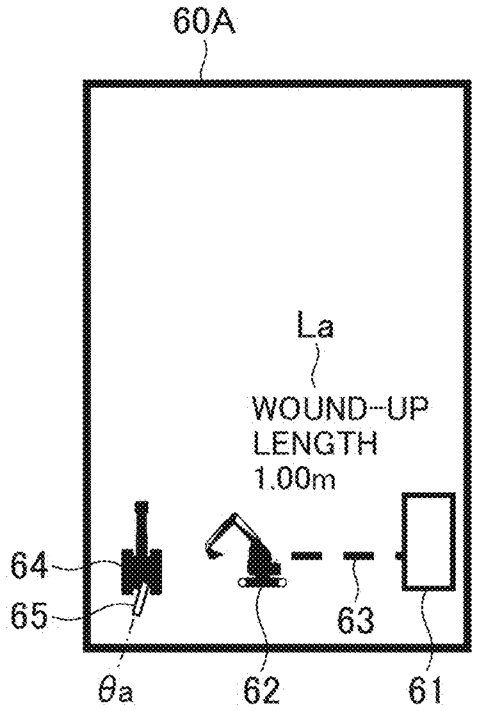
[FIG. 11B]
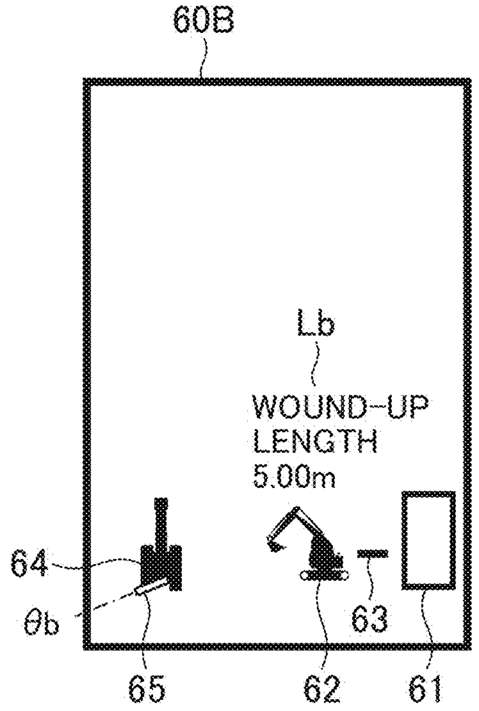

POWER FEED SYSTEM OF ELECTRICALLY DRIVEN CONSTRUCTION MACHINE

TECHNICAL FIELD

The present invention relates to a power feed system of an electrically driven construction machine that causes power to be provided from an external power supply to the electrically driven construction machine through a power feed cable.

BACKGROUND ART

An electrically driven excavator that is one of electrically driven construction machines includes, for example, a track structure, a swing structure swingably disposed on the upper side of the track structure, an electrically driven motor mounted in the swing structure, a hydraulic pump that is mounted in the swing structure and is driven by the electrically driven motor, and a hydraulic actuator driven by a hydraulic fluid delivered from the hydraulic pump. There is an electrically driven excavator configured such that a power feed cable can be connected to the swing structure side, and power from an external power supply is provided through the power feed cable. Further, an electrically driven motor is driven by the power provided through the power feed cable. Alternatively, a battery mounted in the swing structure is charged by the power provided through the power feed cable, and the electrically driven motor is driven by the power of the battery.

The above-described electrically driven excavator involves a possibility that the power feed cable is damaged when action such as swing is executed in a state in which the power feed cable is connected. Patent Document 1 discloses a cable stand for suppressing damage to the power feed cable. The cable stand of Patent Document 1 is attached to a swing structure of an electrically driven excavator in a state in which the cable stand can rotate around a vertical axis, to guide the power feed cable. Further, for example, in response to swing of the swing structure, the cable stand rotates in an opposite direction thereto, which prevents application of an excessive load to the power feed cable.

Patent Document 2 discloses a power feed system that causes power to be provided from an external power supply to an electrically driven excavator through a power feed cable. This power feed system includes a cable drum from and by which the power feed cable from the external power supply is drawn out and wound up, a sensing section that senses a draw-out length of the power feed cable drawn out from the cable drum, an alarm section, and a controller that controls the alarm section. The controller controls the alarm section to issue an alarm when the draw-out length of the power feed cable sensed by the sensing section is the maximum. Due to this, a worker causes the electrically driven excavator to operate in such a direction as to come closer to the external power supply or operates the electrically driven excavator in a state in which the power feed cable is disconnected. Hence, damage to the power feed cable can be suppressed.

PRIOR ART DOCUMENT

Patent Documents

Patent Document 1: JP-2018-084099-A
Patent Document 2: KR-10-2012-0114879-A

SUMMARY OF THE INVENTION

Problem to be Solved by the Invention

Employing the cable stand of Patent Document 1 can suppress damage to the power feed cable. However, although Patent Document 1 does not give a clear description, a rotation range of the cable stand is limited for a reason such as avoidance of contact between the cable stand and a cab or the like. Further, there is a possibility that the power feed cable gets caught in the machine body if the swing structure of the electrically driven excavator swings in a state in which the rotation of the cable stand has reached the limit. Accordingly, the worker needs to operate the electrically driven excavator, for example, while visually checking the state of the power feed cable. This causes the lowering of the work efficiency.

Moreover, employing the power feed system of Patent Document 2 can suppress damage to the power feed cable. However, unless the draw-out length of the power feed cable becomes the maximum, the worker cannot recognize an operable range of the electrically driven excavator. As a result, the lowering of the work efficiency is caused.

The present invention is made in view of the above-described circumstances, and an object thereof is to provide a power feed system of an electrically driven construction machine that can enhance the work efficiency of the electrically driven construction machine while damage to a power feed cable is prevented.

Means for Solving the Problem

In order to achieve the above-described object, the present invention provides a power feed system of an electrically driven construction machine. The power feed system causes power to be provided from an external power supply to the electrically driven construction machine through a power feed cable. The power feed system includes: a cable drum from and by which the power feed cable from the external power supply is drawn out and wound up; a drum sensor that senses a state quantity of the cable drum, the state quantity changing depending on drawing-out and winding-up of the power feed cable; a rotation angle sensor that senses a routing direction of the power feed cable with respect to the electrically driven construction machine; a monitor; and a controller that controls display on the monitor. The controller is configured to compute a wound-up length of the power feed cable wound up by the cable drum on the basis of the state quantity of the cable drum sensed by the drum sensor and cause the monitor to simultaneously display the wound-up length and the routing direction sensed by the rotation angle sensor.

Advantages of the Invention

According to the present invention, the work efficiency of the electrically driven construction machine can be enhanced while damage to the power feed cable is prevented.

BRIEF DESCRIPTION OF THE DRAWINGS

FIG. 1 is a diagram representing a configuration of a power feed system in one embodiment of the present invention.

FIG. 2 is a diagram representing a structure of a cable drum in the one embodiment of the present invention.

FIG. 3 is a right side view representing an overall structure of an electrically driven excavator in the one embodiment of the present invention.

FIG. 4 is a rear view representing the overall structure of the electrically driven excavator in the one embodiment of the present invention.

FIG. 5 is a perspective view representing a structure of a cable stand of the electrically driven excavator in the one embodiment of the present invention.

FIG. 6 is a left side view representing the structure of the cable stand of the electrically driven excavator in the one embodiment of the present invention.

FIG. 7 is a diagram representing a configuration relating to a boom cylinder in a configuration of a drive system of the electrically driven excavator in the one embodiment of the present invention.

FIG. 8 is a block diagram representing a configuration of a power system of the electrically driven excavator in the one embodiment of the present invention together with pieces of related equipment.

FIG. 9 is a flowchart representing contents of display control of a wound-up length of a power feed cable in the one embodiment of the present invention.

FIG. 10 is a flowchart representing contents of display control of a rotation angle of the cable stand in the one embodiment of the present invention.

FIG. 11A is a diagram representing a specific example of a display screen of a monitor of the electrically driven excavator in the one embodiment of the present invention.

FIG. 11B is a diagram representing a specific example of the display screen of the monitor of the electrically driven excavator in the one embodiment of the present invention.

MODE FOR CARRYING OUT THE INVENTION

One embodiment of the present invention is described with reference to the drawings.

FIG. 1 is a diagram representing a configuration of a power feed system in the present embodiment. FIG. 2 is a diagram (diagram as viewed in a direction of an arrow II in FIG. 1) representing a structure of a cable drum in the present embodiment. FIG. 3 is a right side view representing an overall structure of an electrically driven excavator in the present embodiment. FIG. 4 is a rear view (diagram as viewed in a direction of an arrow IV in FIG. 3) representing the overall structure of the electrically driven excavator in the present embodiment. FIG. 5 is a perspective view representing a structure of a cable stand of the electrically driven excavator in the present embodiment. FIG. 6 is a left side view (diagram as viewed in a direction of an arrow VI in FIG. 5) representing the structure of the cable stand of the electrically driven excavator in the present embodiment.

The power feed system of the present embodiment is a system that causes power to be provided from an external power supply 1 (for example, a commercial power supply) to an electrically driven excavator 3 (electrically driven construction machine) through a power feed cable 2, and includes a cable drum 4 from and by which the power feed cable 2 from the external power supply 1 is drawn out and wound up.

The cable drum 4 includes a drum main body 5 around which the power feed cable 2 is wound, a support base 6 that rotatably supports the drum main body 5, a spring (not depicted) that biases the drum main body 5, and a drum sensor 7 that senses a rotation amount of the drum main body 5 (hereinafter, referred to as a rotation amount of the cable drum 4). The drum main body 5 rotates in one direction against a biasing force of the spring. This causes the power feed cable 2 to be drawn out from the drum main body 5. Alternatively, the drum main body 5 rotates in the opposite direction by the biasing force of the spring. This causes the power feed cable 2 to be wound up by the drum main body 5. The drum sensor 7 outputs a sensing signal to a controller (details are described later) of the electrically driven excavator 3 through a signal line 8. Hence, the cable drum 4 allows drawing-out and winding-up of the signal line 8 as well.

The electrically driven excavator 3 includes a track structure 11, a swing structure 12 swingably disposed on the upper side of the track structure 11, and a work device 13 joined to the front side of the swing structure 12 (right side in FIGS. 1 and 3). The track structure 11 travels by rotation of travelling motors (not depicted), and the swing structure 12 swings by rotation of a swing motor (not depicted).

The work device 13 includes, for example, a swing post 14 joined to the front side of the swing structure 12 pivotally in the left-right direction, a boom 15 joined to the upper side of the swing post 14 pivotally in the upward-downward direction, an arm 16 joined to the tip side of the boom 15 pivotally in the upward-downward direction, and a bucket 17 joined to the tip side of the arm 16 pivotally in the upward-downward direction. The swing post 14 pivots by elongation and contraction of a swing cylinder 18. The boom 15 pivots by elongation and contraction of a boom cylinder 19. The arm 16 pivots by elongation and contraction of an arm cylinder 20. The bucket 17 pivots by elongation and contraction of a bucket cylinder 21.

The swing structure 12 includes a swing frame 22 forming a lower-portion basic structure, a cab (operation room) 23 disposed on the left side (far side relative to the plane of paper in each of FIGS. 1 and 3) of the swing frame 22, and a counterweight 24 disposed on the rear side (left side in each of FIGS. 1 and 3) of the swing frame 22.

Further, the swing structure 12 includes a cable connector 25 that is disposed on the upper side of the counterweight 24 and to which the power feed cable 2 can be connected, and a connection sensor 26 (see FIG. 8 to be described later) that senses the state in which the power feed cable 2 is connected to the cable connector 25. The swing structure 12 also includes a signal line connector 27 that is disposed on the upper side of the counterweight 24 and to which the signal line 8 can be connected, and a cable stand 28 that is attached to the upper side of the counterweight 24 in a state in which the cable stand 28 can rotate around a vertical axis and that guides the power feed cable 2 and the signal line 8.

The cable stand 28 includes a pedestal 29 fixed to the counterweight 24, a rotating shaft 30 supported rotatably around the vertical axis by a bearing (not depicted) of the pedestal 29, and a support frame 31 extending in a horizontal direction from the rotating shaft 30. The cable stand 28 also includes a clamp 32 that is disposed on the tip side of the support frame 31 and that grasps the power feed cable 2, a plurality of support tools 33 that are disposed on the rotating shaft 30 and the clamp 32 and that support the signal line 8, and a rotation angle sensor 34 that senses a rotation angle of the rotating shaft 30 with respect to the pedestal 29 (hereinafter, referred to as a rotation angle of the cable stand 28). It is to be noted that the rotation angle sensor 34 corresponds to a rotation angle sensor that senses a routing direction of the power feed cable with respect to the electrically driven construction machine set forth in the scope of claims and corresponds to a rotation angle sensor that senses the rotation angle of the cable stand around the vertical axis as the routing direction of the power feed cable with respect to the electrically driven construction machine.

For example, in a case in which the swing structure 12 swings relative to the track structure 11 in a clockwise direction as viewed from the upper side, the rotating shaft 30 and the support frame 31 of the cable stand 28 rotate relative to the swing structure 12 in a counterclockwise direction as viewed from the upper side. Further, for example, in a case in which the swing structure 12 swings relative to the track structure 11 in a counterclockwise direction as viewed from the upper side, the rotating shaft 30 and the support frame 31 of the cable stand 28 rotate relative to the swing structure 12 in a clockwise direction as viewed from the upper side. This prevents application of an excessive load to the power feed cable 2 and the signal line 8. However, for a reason such as avoidance of contact between the support frame 31 of the cable stand 28 and the cab 23 or the like, a rotation range of the rotating shaft 30 is limited by stoppers that are not depicted.

In the present embodiment, the rotation angle in a state in which the support frame 31 is oriented in the rear direction of the swing structure 12 (see FIGS. 1 and 3 to 6) is defined as a reference value (0 degrees) of the rotation angle of the cable stand 28. Moreover, when definition is made such that the rotation angle of the cable stand 28 increases as the support frame 31 rotates in a clockwise direction from the above-described state, the rotation angle of the cable stand 28 is limited to, for example, 90 degrees (limit value of one side). In addition, when definition is made such that the rotation angle of the cable stand 28 increases as the support frame 31 rotates in a counterclockwise direction from the above-described state, the rotation angle of the cable stand 28 is limited to, for example, 90 degrees (limit value of the other side).

An operation seat (not depicted) on which a worker sits is disposed in the cab 23. Operation levers and pedals for travelling (not depicted) that can be operated by the worker are disposed on the front side of the operation seat. The operation levers and pedals for travelling make an instruction of action of the track structure 11 by operation in the front-rear direction. An operation pedal for swing (not depicted) that can be operated by the operator is disposed on the right side of the operation levers for travelling. The operation pedal for swing makes an instruction of action of the swing post 14 by operation in the left-right direction.

An operation lever for work (not depicted) that can be operated by the worker is disposed on the left side of the operation seat. This operation lever for work makes an instruction of action of the swing structure 12 by operation in the left-right direction, and makes an instruction of action of the arm 16 by operation in the front-rear direction. An operation lever 35 for work (see FIG. 7 to be described later) that can be operated by the worker is disposed on the right side of the operation seat. The operation lever 35 for work makes an instruction of action of the bucket 17 by operation in the left-right direction, and makes an instruction of action of the boom 15 by operation in the front-rear direction.

A lock lever 36 (see FIG. 7 to be described later) that can be operated by the worker is disposed on the left side of the operation seat. The lock lever 36 is selectively operated to a lock position and a lock release position. It is to be noted that the lock lever of the present embodiment is a gate lock lever disposed at an entrance/exit of the cab 23 and permits the worker to get on and off when being operated to the lock position (rising position) and prevents the worker from getting on and off when being operated to the lock release position (lowering position). A monitor 37 (see FIG. 8 to be described later) that allows the worker to visually recognize or operate is disposed on the right side and the front side of the operation seat.

The electrically driven excavator 3 includes a drive system that drives a plurality of hydraulic actuators (specifically, the above-described travelling motors, swing motor, swing cylinder 18, boom cylinder 19, arm cylinder 20, and bucket cylinder 21). FIG. 7 is a diagram representing a configuration relating to the boom cylinder 19 in a configuration of the drive system of the electrically driven excavator 3 in the present embodiment.

The drive system of the present embodiment includes an electrically driven motor 38, a hydraulic pump 39 and a pilot pump 40 that are driven by the electrically driven motor 38, a control valve 41 that controls the flow (specifically, a direction and a flow rate) of a hydraulic fluid from the hydraulic pump 39 to the boom cylinder 19, and an operation device 42 that switches the control valve 41. It is to be noted that the operation device 42 is mounted in the cab 23 of the swing structure 12 and the electrically driven motor 38, the hydraulic pump 39, the pilot pump 40, and the control valve 41 are mounted in the other part of the swing structure 12.

The operation device 42 has the above-described operation lever 35 for work, a pilot valve 43A that generates a pilot pressure by reducing the delivery pressure of the pilot pump 40 according to the front-side operation amount of the operation lever 35 for work, and a pilot valve 43B that generates a pilot pressure by reducing the delivery pressure of the pilot pump 40 according to the rear-side operation amount of the operation lever 35 for work.

Further, when an operator operates the operation lever 35 for work forward, the pilot pressure generated by the pilot valve 43A according to the operation amount thereof is output to a pressure receiving portion 44A of the control valve 41, and thereby the control valve 41 is switched to a switching position on the right side depicted in the figure. Thereby, the boom cylinder 19 contracts. When the operator operates the operation lever 35 for work rearward, the pilot pressure generated by the pilot valve 43B according to the operation amount thereof is output to a pressure receiving portion 44B of the control valve 41, and thereby the control valve 41 is switched to a switching position on the left side depicted in the figure. Thereby, the boom cylinder 19 elongates.

It is to be noted that configurations relating to the other actuators (specifically, the travelling motors, the swing motor, the swing cylinder 18, the arm cylinder 20, and the bucket cylinder 21) are also similar to the configuration relating to the boom cylinder 19. That is, corresponding control valves are switched by the pilot pressures from corresponding operation devices, and the other actuators operate by the hydraulic fluid supplied from the hydraulic pump through each of these control valves.

The drive system of the present embodiment further includes a lock valve 45 disposed between all operation devices and the pilot pump 40 as a lock device that can execute switching between a disabled state (locked state) and an enabled state (lock release state) of operation of the electrically driven excavator 3.

The lock valve 45 is switched in response to operation of the above-described lock lever 36. Specifically, the lock lever 36 is provided with a lock switch 46. When the lock lever 36 is operated to the lock position (rising position), the lock switch 46 becomes the opened state. Thus, a solenoid portion of the lock valve 45 is not energized. Accordingly, the lock valve 45 is set to an interruption position on the right side depicted in the figure, and the delivery pressure of the pilot pump 40 is introduced to none of the operation devices (locked state). Therefore, driving is prohibited regarding all hydraulic actuators. Conversely, when the lock lever 36 is operated to the lock release position (lowering position), the lock switch 46 becomes the closed state. Thus, the solenoid portion of the lock valve 45 is energized, and the lock valve 45 is switched to a communication position on the left side depicted in the figure, so that the delivery pressure of the pilot pump 40 is introduced to all operation devices (lock release state). Therefore, driving regarding all actuators is permitted (lock release state). It is to be noted that the lock switch 46 corresponds to the operation sensor that senses the enabled state and the disabled state of operation of the electrically driven construction machine set forth in the scope of claims.

The electrically driven motor 38 is driven by power provided from the external power supply 1 through the power feed cable 2. Alternatively, the electrically driven motor 38 is driven by power of a battery 47 (see FIG. 8 to be described later) charged by the power provided from the external power supply 1 through the power feed cable 2. An electrical system of the electrically driven excavator 3 configured in this manner is described with use of FIG. 8. FIG. 8 is a block diagram representing a configuration of the electrical system of the electrically driven excavator in the present embodiment together with pieces of related equipment.

The electrical system of the present embodiment includes a rectifier 48 that converts AC power provided from the external power supply 1 through the power feed cable 2 to DC power, an inverter 49 that controls the rotation speed of the electrically driven motor 38, a switch 50 that switches the connection among the rectifier 48, the inverter 49, and the battery 47, and a controller 51 that controls the switch 50, the inverter 49, the monitor 37, and the like. It is to be noted that the battery 47, the rectifier 48, the inverter 49, the switch 50, and the controller 51 are mounted in the swing structure 12.

Although not depicted, the controller 51 has a processor that executes processing in accordance with a program, a memory that stores the program and data, and the like. When sensing the state in which the power feed cable 2 is connected to the cable connector 25 by the connection sensor 26, the controller 51 controls the switch 50 to connect the rectifier 48 to the inverter 49 or the battery 47. In this case, the electrically driven motor 38 is driven by the power provided from the external power supply 1 through the power feed cable 2.

Alternatively, when sensing the state in which the power feed cable 2 is connected to the cable connector 25 by the connection sensor 26, the controller 51 controls the switch 50 to connect the rectifier 48 to the battery 47. This causes the battery 47 to be charged by the power provided from the external power supply 1 through the power feed cable 2. When sensing the state in which the power feed cable 2 is not connected to the cable connector 25 by the connection sensor 26, the controller 51 controls the switch 50 to connect the inverter 49 to the battery 47. In this case, the electrically driven motor 38 is driven by power of the battery 47.

Here, as a characteristic of the present embodiment, the controller 51 computes a wound-up length of the power feed cable 2 wound up by the cable drum 4 on the basis of the rotation amount of the cable drum 4 sensed by the drum sensor 7. Further, the controller 51 executes control to cause the monitor 37 to simultaneously display the computed wound-up length and the rotation angle of the cable stand 28 sensed by the rotation angle sensor 34 (in other words, the routing direction of the power feed cable 2 with respect to the electrically driven excavator 3). In the following, the display control of the wound-up length of the power feed cable 2 and the display control of the rotation angle of the cable stand 28 are separately described.

The display control of the wound-up length of the power feed cable 2 is described with use of FIG. 9. FIG. 9 is a flowchart representing the contents of the display control of the wound-up length of the power feed cable in the present embodiment.

In step S1, the controller 51 determines whether the power feed cable 2 is connected to the cable connector 25 by the sensing result of the connection sensor 26. When the power feed cable 2 is connected to the cable connector 25, the controller 51 advances the flowchart to step S2. In step S2, the controller 51 computes a wound-up length L of the power feed cable 2 on the basis of the rotation amount of the cable drum 4 sensed by the drum sensor 7. Thereafter, the controller 51 advances the flowchart to step S3 and causes the monitor 37 to display the wound-up length L of the power feed cable 2. For example, as depicted in FIG. 11A, on a display screen 60A of the monitor 37, the controller 51 causes a numerical value of a wound-up length La of the power feed cable 2 to be displayed, and causes the draw-out length of the power feed cable 2 drawn out from the cable drum 4 to be displayed as an image by a power feed cable icon 63 between an external power supply icon 61 and an excavator icon 62. Moreover, for example, as depicted in FIG. 11B, on a display screen 60B of the monitor 37, the controller 51 causes a numerical value of a wound-up length Lb of the power feed cable 2 to be displayed, and causes the draw-out length of the power feed cable 2 drawn out from the cable drum 4 to be displayed as an image by the power feed cable icon 63 between the external power supply icon 61 and the excavator icon 62.

The controller 51 advances the flowchart to step S4 and determines whether the lock valve 45 is in the locked state depending on whether the lock switch 46 is in the opened state. When the lock valve 45 is not in the locked state, the controller 51 advances the flowchart to step S5. In step S5, the controller 51 determines whether the wound-up length L of the power feed cable 2 is equal to or shorter than a predetermined value Lth (Lth>0). When the wound-up length L of the power feed cable 2 is equal to or shorter than the predetermined value Lth, the controller 51 advances the flowchart to step S6. In step S6, the controller 51 issues a warning by causing the monitor 37 to display, for example, a message of "the wound-up length of the power feed cable is short." It is to be noted that the controller 51 does not advance the flowchart to steps S5 and S6 and does not issue the warning when the lock valve 45 is in the locked state (that is, when the electrically driven excavator 3 is in the disabled state of operation).

In light of the foregoing description, the worker can easily check the wound-up length of the power feed cable 2 and recognize an operable range of the electrically driven excavator 3 at any timing. Hence, the work efficiency of the electrically driven excavator 3 can be enhanced. Further, in a case in which the warning relating to the wound-up length of the power feed cable 2 is issued, the worker causes the electrically driven excavator 3 to operate in such a direction as to come closer to the external power supply 1 or operates the electrically driven excavator 3 in a state in which the power feed cable 2 is disconnected. Thus, damage to the power feed cable 2 can be suppressed.

The display control of the rotation angle of the cable stand 28 is described with use of FIG. 10. FIG. 10 is a flowchart representing the contents of the display control of the rotation angle of the cable stand in the present embodiment.

In step S1, the controller 51 determines whether the power feed cable 2 is connected to the cable connector 25 by the sensing result of the connection sensor 26. When the power feed cable 2 is connected to the cable connector 25, the controller 51 advances the flowchart to step S7. In step S7, the controller 51 causes the monitor 37 to display a rotation angle θ of the cable stand 28 sensed by the rotation angle sensor 34. For example, as depicted in FIG. 11A, on the display screen 60A of the monitor 37, the controller 51 causes a rotation angle θa of the cable stand 28 to be displayed as an image by the orientation of a cable stand icon 65 with respect to the excavator icon 64. Further, for example, as depicted in FIG. 11B, on the display screen 60B of the monitor 37, the controller 51 causes a rotation angle θb of the cable stand 28 to be displayed as an image by the orientation of the cable stand icon 65 with respect to the excavator icon 64.

The controller 51 advances the flowchart to step S4 and determines whether the lock valve 45 is in the locked state depending on whether the lock switch 46 is in the opened state. When the lock valve 45 is not in the locked state, the controller 51 advances the flowchart to step S8. In step S8, the controller 51 determines whether the rotation angle θ of the cable stand 28 has reached a set value θth of one side in the rotation direction (specifically, a value that is preset to be on the inner side of the rotation range of the cable stand 28 relative to the limit value of the one side, the limit value limiting the range and is, for example, 80 degrees) or whether the rotation angle θ of the cable stand 28 has reached a set value θth of the other side in the rotation direction (specifically, a value that is preset to be on the inner of the rotation range of the cable stand 28 relative to the limit value of the other side, the limit value limitting the range and is, for example, 80 degrees). The controller 51 advances the flowchart to step S9 when the rotation angle θ of the cable stand 28 has reached the set value θth of the one side in the rotation direction or the set value θth of the other side. In step S9, the controller 51 issues a warning by causing the monitor 37 to display, for example, a message of "the rotation angle of the cable stand is large." It is to be noted that the controller 51 does not advance the flowchart to steps S8 and S9 and does not issue the warning when the lock valve 45 is in the locked state (that is, when the electrically driven excavator 3 is in the disabled state of operation).

In light of the foregoing description, the worker can easily check the rotation angle of the cable stand 28 and recognize the operable range of the electrically driven excavator 3 at any timing. Thus, the work efficiency of the electrically driven excavator 3 can be enhanced. Further, in a case in which the warning relating to the rotation angle of the cable stand 28 is issued, the worker causes the electrically driven excavator 3 to operate in such a direction as to come closer to the external power supply 1 or operates the electrically driven excavator 3 in a state in which the power feed cable 2 is disconnected. Hence, damage to the power feed cable 2 can be suppressed.

It is to be noted that, although the description has been given by taking as an example the case in which the drum sensor 7 senses the rotation amount of the drum main body 5 in the above-described one embodiment, the configuration is not limited thereto. It is sufficient to sense a state quantity of the cable drum 4 that changes depending on drawing-out and winding-up of the power feed cable 2. For example, the drum sensor 7 may sense the weight of the drum main body 5.

Further, in the above-described one embodiment, the description has been given by taking as an example the case in which the controller 51 causes display of a message by the monitor 37 (informing device) as the warning of the wound-up length of the power feed cable 2 and the warning of the rotation angle of the cable stand 28. However, the configuration is not limited thereto and informing by another informing device may be executed. That is, a warning by a buzzer or the like may be made.

Moreover, in the above-described one embodiment, the description has been given by taking as an example the case in which the drum sensor 7 outputs a sensing signal to the controller 51 of the electrically driven excavator 3 through the signal line 8. However, the configuration is not limited thereto. The drum sensor 7 may output the sensing signal to the controller 51 of the electrically driven excavator 3 by wireless communication. In this case, the cable drum 4 does not execute drawing-out and winding-up of the signal line 8.

In addition, in the above-described one embodiment, the description has been given by taking as an example the case in which the electrically driven construction machine is the electrically driven excavator. However, the configuration is not limited thereto. That is, it is sufficient if an electrically driven construction machine includes a track structure, a swing structure swingably disposed on the upper side of the track structure, and a work device joined to the swing structure. For example, the electrically driven construction machine may be an electrically driven crane or the like.

DESCRIPTION OF REFERENCE CHARACTERS

- 1: External power supply
- 2: Power feed cable
- 3: Electrically driven excavator (electrically driven construction machine)
- 4: Cable drum
- 7: Drum sensor
- 11: Track structure
- 12: Swing structure
- 28: Cable stand
- 34: Rotation angle sensor
- 37: Monitor
- 46: Lock switch (operation sensor)
- 51: Controller

The invention claimed is:

1. A power feed system of an electrically driven construction machine, the power feed system causing power to be provided from an external power supply to the electrically driven construction machine through a power feed cable, the power feed system comprising:

a cable drum from and by which the power feed cable from the external power supply is drawn out and wound up;

a drum sensor that senses a state quantity of the cable drum, the state quantity changing depending on a drawing-out and a winding-up of the power feed cable;

a cable stand attached to the electrically driven construction machine in a state in which the cable stand is rotatable around a vertical axis, the cable stand guiding the power feed cable;

a rotation angle sensor that senses a rotation angle of the cable stand around the vertical axis;

a monitor; and a controller that controls display on the monitor, wherein the controller is configured to compute a wound-up length of the power feed cable wound up by the cable drum on a basis of the state quantity of the cable drum sensed by the drum sensor and cause the monitor to simultaneously display a numerical value of the wound-up length, a power feed cable icon that depicts a draw-out length of the power feed cable drawn out from the cable drum, and a cable stand icon that depicts the rotation angle of the cable stand sensed by the rotation angle sensor.

2. The power feed system of the electrically driven construction machine according to claim 1, wherein the cable stand is attached to a swing structure swingably disposed on an upper side of a track structure in the electrically driven construction machine.

3. The power feed system of the electrically driven construction machine according to claim 1, wherein the controller is configured to execute informing by an information device when the wound-up length is equal to or shorter than a predetermined value or the rotation angle of the cable stand around the vertical axis has reached a set value.

4. The power feed system of the electrically driven construction machine according to claim 1, wherein the controller is configured to execute informing by an information device when the wound-up length is equal to or shorter than a predetermined value or the rotation angle of the cable stand around the vertical axis has reached a set value of one side in a rotation direction or a set value of another side.

5. The power feed system of the electrically driven construction machine according to claim 1, wherein the controller is configured to execute informing by an information device when the wound-up length is equal to or shorter than a predetermined value or the rotation angle of the cable stand has reached a set value of one side in a rotation direction or a set value of another side, and the set value of the one side is preset to be on an inner side of a rotation range of the cable stand relative to a limit value of the one side, the limit value limiting the range, and the set value of the other side is preset to be on an inner side of the rotation range of the cable stand relative to a limit value of the other side, the limit value limiting the range.

* * * * *